Figure 1:
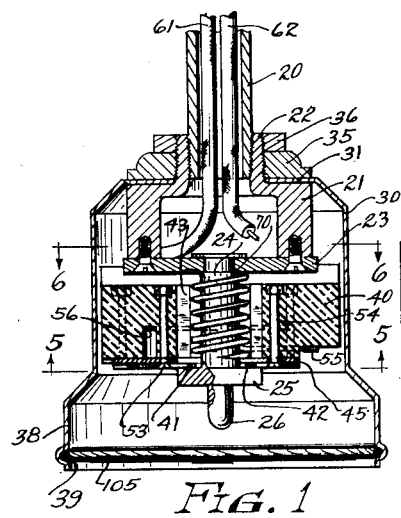

Dec. 19, 1933.                J. A. McKAY                1,940,429
SEPARABLE ELECTRIC SOCKET
Filed May 19, 1930                2 Sheets-Sheet 1

Inventor
John A. McKay,
By Bates Goldrick Hearn
Attorneys

Dec. 19, 1933.     J. A. McKAY     1,940,429
SEPARABLE ELECTRIC SOCKET
Filed May 19, 1930     2 Sheets-Sheet 2
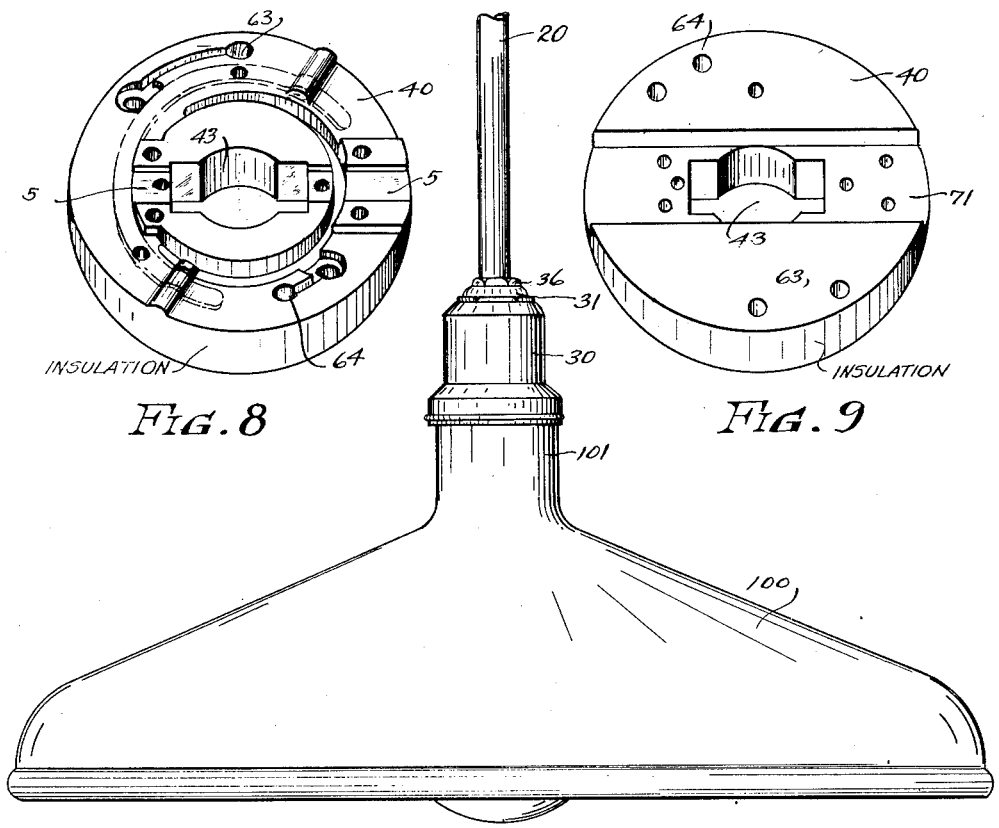
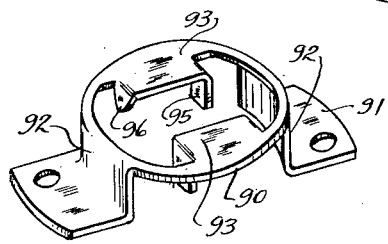
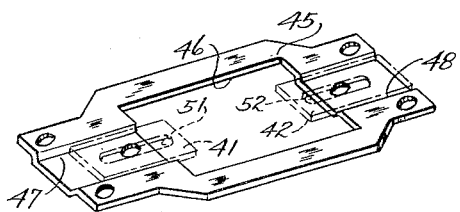
Inventor
John A. McKay,
By Bates Goldrick & Fearn,
Attorneys Patented Dec. 19, 1933

1,940,429

UNITED STATES PATENT OFFICE 1,940,429

SEPARABLE ELECTRIC SOCKET

John A. McKay, Coshocton, Ohio, assignor to The Jones Metal Products Company, West Lafayette, Ohio, a corporation of Ohio Application May 19, 1930. Serial No. 453,582

15 Claims. (Cl. 173—344)

In electric power and light installations in industrial plants and various other environments it is very desirable to employ separable sockets, enabling the removal of lamps with their reflectors, for cleaning, replacement or repair, and also enabling the mounting of extra lights in various places or the discarding of lights already mounted.

Furthermore, the tendency in modern industrial plants is to provide each individual machine with an independent electric motor drive, and thus a large number of power outlets are required. By the use of such separable sockets, a large number of power and light connections may be conveniently and economically provided, and the flexibility of the electric light and power system will be greatly increased. Installation may be made with the permanent portions of the sockets at all points where lights or power outlets probably will be desired, and the separable portions carrying lamps and reflectors, or the power outlet connector, may be then mounted only as required by the light conditions and the position of the various machines, thus enabling a material saving in expense where powerful lights and large reflectors are employed, and also providing convenient power outlets for the machines, regardless of their locations.

The present invention relates to a separable socket designed for such use. In the present disclosure I have shown a separable portion of the socket as being particularly adapted to support a lamp and reflector, but it is to be understood that the separable portion may also be adapted for use as a power outlet, as outlined above.

The permanent portion of my socket may be mounted on the end of an outlet conduit, or secured directly to a ceiling wall, or to a bracket or any other suitable support. Such permanent portion of the installation is adapted to carry an independent removable hood, enabling the selection of the hood with reference to the type of reflector to be used in connection with the separable portion, the hood having provision for making a water-tight connection with the reflector, whereby the device is readily adaptable for use outdoors.

My invention contemplates a socket in which proper polarity is insured after each separable portion is installed. In my socket, the supporting connection from the removable portion to the fixed installation is made by metal to metal contact independent of the electrical contact, so that an effective support is provided. The electrical contacts of the permanent members are carried by a porcelain insulator, which, however, is independent of the physical support of the removable member, or of the reflector.

My invention also contemplates a separable socket in which the removable member is attached to the permanent portion of the installation, by being simply shoved toward it against a resisting spring and given a quarter turn, after which the reaction of the spring forces the removable member slightly outwardly and locks the parts against displacement. I have so devised the socket that the removable portions may be inserted in either of two diametrically opposite positions, but in either case each terminal of the movable portions can engage only a certain terminal of the fixed portion, so that the polarity is the same whichever way the movable portion is inserted.

The above and other features contributing to the efficiency of my socket will be hereinafter more fully explained in connection with the embodiment shown in the drawings. The essential novel features of the invention are summarized in the claims.

Figure 3:
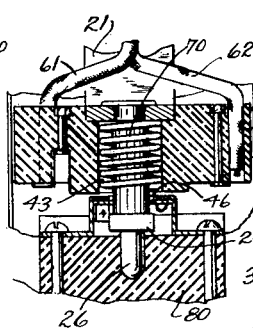
Figure 4:
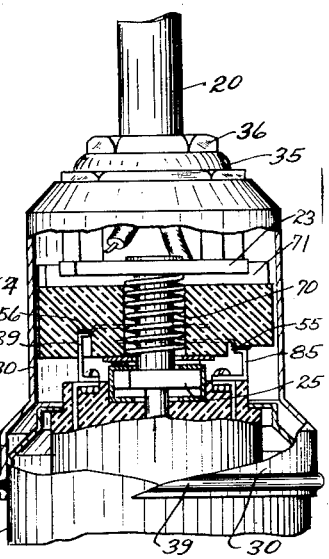
Figures 2, 5:
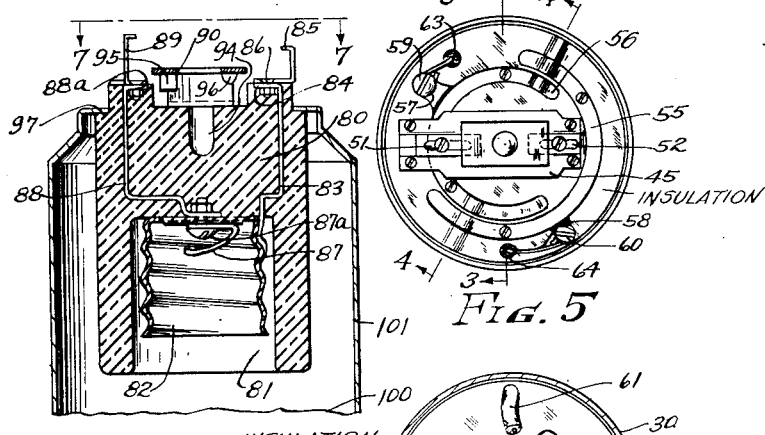
Figure 6:
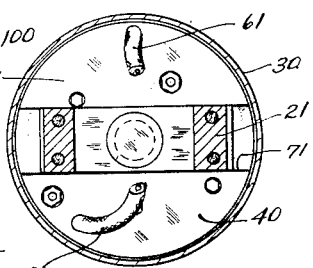
Figure 7:
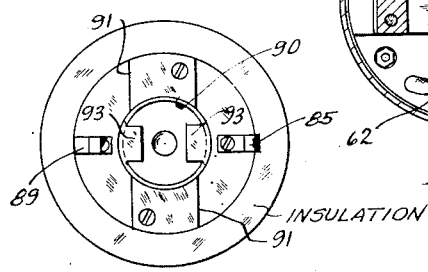

In the drawings, Fig. 1 is a vertical axial section through the fixed portion of the socket, shown as suspended from an outlet conduit; Fig. 2 is a corresponding section of the removable portion of the socket; Fig. 3 is an axial section through the cooperating parts of the fixed and movable portions of the sockets, at right angles to Fig. 1, and along the line 3—3 of Fig. 5; Fig. 4 is a cross-sectional elevation of the two parts of the socket connected together, taken along the line 4—4 of Fig. 5; Fig. 5 is substantially a bottom view of the fixed portion of the socket, the same being a section through the hood, as indicated by the line 5—5 on Fig. 1; Fig. 6 is a transverse section through the fixed portion of the socket, as indicated by the line 6—6 on Fig. 1; Fig. 7 is a top view of the removable portion, as indicated by the line 7—7 of Fig. 2; Fig. 8 and Fig. 9 are bottom and top perspective views, respectively, of the porcelain insulating member; Fig. 10 is a perspective of the supporting member, which is secured to the removable portions; Fig. 11 is a perspective of the member which supports the porcelain insulating ring; and Fig. 12 is an elevation of the assembled socket, showing the reflector and lamp in place.

As shown in Figs. 1 and 4, the permanent portions of my socket may be supported on the end of an outlet conduit 20, by means of a yoke 21, having an internally threaded sleeve 22. A suitable metal cross-bar 23 may be permanently fixed in position to the yoke, and rigidly carries a depending stud 24 on which is a laterally extending portion 25, the stud having a reduced extension 26 below this projection. The projection 25 is of greater length than width, wherefore a removable socket portion, having a corresponding opening, may be shoved beyond the projection and then turned to lie on top of its wider portion. Thus, the removable part of the device is actually supported by the metal members 24 and 25, which, in turn, are supported from the conduit by the metal bar 23 and the yoke 21. The extension 26 serves as a pilot to immediately and easily position the parts.

The yoke 21 may likewise furnish the support for a hood 30. Such hood is shown as a sheet metal, hollow, cup-like member, surrounding the permanent part of the socket, and having an inwardly extending flange 31 resting on a shoulder provided by the yoke 21, outside of its sleeve-portion 22. The outer surface of the sleeve-portion may also be threaded, and may carry lock nuts 35 and 36 for clamping the hood in place.

The electric terminals of the fixed portions of the socket are mounted on a porcelain ring 40, (see Figs. 8 and 9), which freely surrounds the stud 24 and may be retained above the extension 25 by a pair of metal lips 41 and 42 carried on the undersurface of the porcelain member, and extending above the projection 25.

In order to provide a construction whereby the socket may be easily assembled, the opening 43 in the porcelain ring may be larger than the extending portion 25. A metal member 45 having an opening 46 adapted to coincide with the opening 43 of the porcelain insulator, and having recessed portions 47 and 48, may be secured to the underside of the porcelain insulator, the recessed portions of the metal member lying within the recesses 5 of the insulator. The lips 41 and 42 are slotted, as at 51 and 52, and may be held in place in the recesses 47 and 48, by means of bolts 53 and 54, which may extend through the porcelain insulating ring.

In assembling the socket, the metal member 45 is secured to the underside of the porcelain ring, with the lips 41 and 42 loosely held in place thereon, both lips being pushed toward the respective ends of the metal member 45. The porcelain insulator, together with the attached metal member and lips, is then pushed over the stud 24 and beyond the projection 25. Then the lips 41 and 42 are slid inwardly, so as to engage and overlie the upper surface of the projection 25 and thereafter the bolts 53 and 54 are tightened to hold the lips securely in place.

The electrical contacts are arcuate metal strips 55 and 56, secured concentrically in recesses on the underside of the porcelain block 40, and lying in different horizontal planes. These strips are provided with ears 57 and 58, into which screws 59 and 60 may be threaded. As shown in Figs. 1 and 4, the insulated conductors 61 and 62 extend through the outlet conduit 20, and into the interior of the yoke 21, and thereafter pass downwardly through the openings 63 and 64, in the porcelain block. Beneath this block the insulation on the wires is removed, and the wires are bent around the screws 59 and 60, and clamped to the ears 57 and 58. It will be seen that the electrical connections from the lead-in wires to the arcuate terminal contact are entirely independent of the support for both socket portions.

The whole porcelain block is normally pressed downwardly by a helical spring 70 surrounding the stud 24, and bearing at its upper end against the cross-bar 23 and at its lower end against the lips 41 and 42. In order to prevent the porcelain insulator from turning, the upper face thereof is recessed, as at 71, (see Fig. 9), the edges of the recess being adapted to engage the cross-bar 23. When the separable portion of the socket is detached, the spring 70 holds the lips 41 and 42 against the projection 25, but when the removable portion is in place, the porcelain is pressed upwardly slightly and the spring causes the arcuate contacts to bear downwardly against the cooperative contacts of the removable member, in a manner to be more fully described hereinafter.

The movable portion of my socket is illustrated particularly in Figs. 2 and 7, and comprises a body 80 of substantially cylindrical form and preferably made of porcelain. The body may have a downwardly facing socket 81 which may be occupied by the usual screw-threaded, metallic socket 82, adapted to carry the lamp. This metallic socket forms one electrical terminal and is connected by a metal bar 83, secured to it and passing longitudinally upward through the porcelain body 80, and may be flanged over at the top, as shown at 84. The contact member for electrically connecting the terminal to the permanent portion of the socket consists of an upright flanged member 85, secured to the flanged portion 84, by a screw 86. The central contact for the lamp, indicated at 87, may be connected by a central screw 87a, with a metallic bar 88, which extends through the porcelain body and is flanged over at the top as at 88a. Another terminal contact 89 having a greater length than the contact 85, may be secured to this flanged portion.

Rigidly secured to the upper end of the porcelain member 80 is a metal box or stirrup 90, (see Figs. 2 and 10), having flanges 91 secured to the porcelain block 80, and having parallel side-walls 92, and a raised portion 93 extending between the side-walls. The raised portion is provided with an opening slightly larger than the projecting member 25 of the stud of the fixed socket member. Located centrally of the porcelain block 80 and beneath the metal box or stirrup 90 is a recess 94.

To install the separable portion of the socket it is simply shoved upwardly within the hood or sleeve 38 of the permanent portion. The stud 26 of the permanent portion passing through the opening in the top of the metal stirrup 90, and finding a seat in the recess 94 of the removable member. Then the removable member is rotated, the stud 26 acting as a pivot, until the opening through the stirrup 90 registers with the exterior of the projection 25 of the support. Then, the continuing upward movement causes the stirrup to pass upwardly about the projecting member 25, and in doing so, to shove upwardly the porcelain member with its contacts, pursuant to which, the plate 45 compresses the spring 70, while the member 25 remains stationary, then after the flanges 93 have come above the top surface of the cross bar 25, the lower portion of the socket is given a quarter rotation in the right hand direction.

Within the stirrup, on diagonally opposite sides, are abutments 95, which prevent rotation in the right hand direction, while on the other sides are webs 96 having a curved lower face which may readily ride on the top surface of the cross bar 25. The total clearance is not sufficient to enable the abutment 95 to come above the projection 25 so that it is impossible to turn the lower member in the left hand direction, but it may be turned in the right hand direction as soon as the stirrup flanges are slightly above the top of the projection 25 and then if not sufficiently elevated when the turning begins, the inclined underface of the web 96 will cam the stirrup and removable portion upwardly so that it will ride over the top of the projection 25.

When the movable portion has been given a quarter turn, the abutments 95 prevent it turning further and then when the pressure is slightly relieved by the attendant, the spring 70 forces the movable section downwardly where it stands with the two pairs of abutments on opposite sides of the cross support 25. This prevents rotation of either movable socket portion in either direction and holds it firmly locked in place.

The porcelain member 80 is of reduced diameter near its upper end, to provide a shoulder 97 on which may rest the inwardly flanged, upper end of a suitable reflector 100, the upper end of which comprises a sleeve portion 101 surrounding the porcelain member 80 as indicated in Fig. 2. The sleeve portion 101 is preferably cylindrical, and slides readily and closely within the downwardly extending sleeve 38 of the hood 30. The inner surface of the hood has a groove 39 near its lower edge, adapted to house an annular packing 105 which may be provided to maintain a water-tight connection, with the exterior of the reflector 101, when the separable portion of the socket is installed, as shown in Fig. 4.

It will be noticed that each of the arcuate contacts 55 and 56 carried by the porcelain block extend for considerably more than a semi-circumference. The result is that the contact 85 may engage the terminal 55 and the contact 89 engage the terminal 56 irrespective of which way the lower member stands when inserted. The contacts will engage near one end of the arc shape terminals in one position and near the opposite ends in the other position, but in any case will stand always on the same terminals. The end portions of the arcuate members are preferably bulged downwardly as indicated in Fig. 5, to insure a good contact.

It will be understood from the description given that all that it is necessary to do to remove a lamp or power outlet connection is to shove it upwardly slightly, give it a quarter turn and then allow it to move downwardly; while the installation is the reverse of these movements. In installing the device, it is not necessary for the operator to pay any attention to how the removable portion stands with reference to the fixed portion; he simply shoves it up in any position, rotates it to the right until he can shove it upwardly further about the retaining projection, and then shoves it up over that, and continues the turning in the only direction he can for a quarter turn. In this installing movement, the reflector sleeve comes into water-tight engagement with the hood by reason of the annular packing between them.

It will be seen that as the hood is entirely separable from the supporting connection, different hoods may be employed in the same installation for different types of reflectors. It will be noticed particularly that when in place the separable portion in my construction is supported by metal members leading directly from the stationary support to the metal anchorage 80 of the lower member and thus the porcelain of the fixed member carrying the contact is entirely relieved of any supporting action and the same is true of the electric terminals themselves on both members.

I claim:

1. In a separable electric socket, the combination of a fixed socket portion, a removable socket portion, cooperating means positioned axially on said socket portions for securing said removable portion to said fixed portion, and positive and negative electrical contacts spaced at different radial distances from the axis of the socket for carrying electricity from the fixed portion to the removable portion.

2. In a separable electric socket, the combination of a fixed socket portion, a removable socket portion, cooperative means positioned axially of said socket portions, for securing said removable portion to said fixed portion in either of two diametrically opposed positions of the removable portion with respect to the fixed portion, electrical terminals in the removable portion, electric contacts in the fixed portion, and means for connecting said contacts to said terminals, said contacts and terminals of opposite polarity being spaced at different distances radially from said axis, whereby the polarity of said terminals will be unchanged regardless of the position of the removable portion.

3. In a separable electric socket, the combination of a fixed socket portion, a removable socket portion, cooperative means including interlocking members disposed along the axis of said socket portions for securing the removable socket portion to the fixed socket portion, and cooperating positive and negative electric contact means spaced away from the axis of the socket, said securing means including provision for yieldingly urging the parts of said cooperative contacts together, and said interlocking members being independent of said contact means.

4. In a separable electric socket, the combination of the fixed socket portion, having a stud rigidly mounted therein, the stud being provided with a laterally projecting portion, an insulating member surrounding said stud and supported by said laterally projecting portion, arcuate contact members mounted on the insulating member, and a removable socket portion having a stirrup adapted to engage said laterally projecting portion of the stud, and contacts adapted to engage said arcuate contacts of the fixed portion.

5. In a separable electric socket, the combination of a fixed socket portion, comprising a yoke adapted to be secured to an electric conduit, a cross-bar secured to said yoke, a stud rigidly mounted on the cross-bar, and having a laterally projecting portion, and a removable socket portion comprising an insulating member, a stirrup secured to the upper face of the insulating member adapted to engage the projecting portion of the fixed socket member, and secure the removable socket member thereto.

6. In a separable electric socket, a fixed socket portion comprising in combination a metal yoke adapted to be supported by an electric conduit, a cross-bar secured to said yoke, a stud rigidly mounted on the cross-bar and having a laterally projecting portion, an insulating member adapted to surround said stud and supported by said laterally projecting portion, means for yieldingly urging said insulating member against said projecting portion and electric contact members mounted on said insulating member.

7. In a separable electric socket, a fixed socket portion comprising means adapted to be secured to an electric conduit, a cross-bar secured to said means, a stud supported by said cross-bar and having a laterally projecting portion, an insulating member adapted to surround said stud and positioned above the projecting portion, means mounted on said insulating member and arranged to overlie the projecting portions of the stud and thereby support the insulating member, yielding means for urging the insulating member downwardly against the projecting portion of the stud, and electric contact members carried by the insulating member.

8. In a separable electric socket, the combination of a fixed socket portion comprising a metal yoke adapted to be secured to an electric conduit, a cross-bar secured to the yoke, a stud rigidly mounted on the cross-bar centrally thereof, and having a laterally projecting portion and a reduced extension below said projecting portion, and a removable socket portion comprising an insulating member, having a recess therein adapted to engage said reduced extension of the stud, and a stirrup mounted on said insulating member and arranged to engage the laterally projecting portion of the stud.

9. In a separable electric socket, the combination of a fixed socket portion, having a stud rigidly mounted therein, said stud having a laterally projecting portion and an extension below the projecting portion, and a removable socket portion having an insulating member, a recess in said insulating member adapted to engage the extension of the stud, and a stirrup secured to said insulating member, said stirrup being adapted to engage said laterally projecting portion, and means associated with the stirrup, whereby a quarter turn thereof will secure the stirrup to the projecting portion, thus locking the removable and fixed socket portions together.

10. In a separable electric socket, the combination of a central stud, an insulating ring carried thereby, a removable socket portion and a locking member on the central stud for locking the removable socket portion thereto, said locking member serving to retain the insulating ring on the stud.

11. In a separable electric socket, the combination of a central stud, an insulating ring carried thereby, means for preventing relative rotation between the ring and the stud, a removable socket portion, a locking member on the central stud for locking the removable socket portion thereto, and means for yieldingly urging the ring toward the locking member.

12. In a separable electric socket, the combination of fixed socket portion, a removable socket portion, means for securing said portions together, said means being operable by a partial rotation of one portion relative to the other, and cooperating pairs of positive and negative electrical contacts spaced different radial distances away from the axis of the socket, for carrying electricity from the fixed portion to the removable portion, at least one contact of each cooperating pair being arcuate in form and adapted to maintain contact throughout the partial rotation of the portions.

13. In a separable electric socket, a fixed socket portion, comprising in combination an axially movable insulating ring, contacts carried on said insulating ring, supporting means independent of said contacts extending through said insulating ring and having a portion projecting laterally beyond it, a removable socket portion adapted to be turned to overlie said projecting portion, and cooperating contacts carried on said removable portion whereby said last-named contacts may be held in endwise abutting relation to the first-named contacts by said supporting means.

14. In a separable electric socket, the combination of a fixed portion, means for mounting the fixed portion on an electric conduit, a removable portion, contacts on the removable portion spaced away from the axis of the socket, an insulating ring mounted slidably but non-rotatably on the fixed portion, a stop for limiting the movement of the insulating ring, means for yieldingly urging the insulating ring toward the stop, contacts on the insulating ring spaced to coact with contacts on the removable portion, and means on the removable portion adapted to overlie the stop, whereby the two portions may be held together with the contacts under spring pressure.

15. In a separable socket, the combination of a support, a separate member carrying a pair of electrical contacts, said support having a shoulder and said separable member having means adapted to be passed over the shoulder when the member is pressed upwardly and turned axially, and an insulating member slidably carried by the support and spring-pressed downwardly against the shoulder when the separate member is disconnected, said insulating member carrying on its underside a pair of electric terminals adapted to be engaged by the respective terminals on the separate member when the latter is in place.

JOHN A. McKAY.